Jan. 14, 1958 J. T. PARSONS ET AL 2,820,187
MOTOR CONTROLLED APPARATUS FOR POSITIONING MACHINE TOOL
Filed May 5, 1952 7 Sheets-Sheet 1

INVENTORS
JOHN T. PARSONS
FRANK L. STULEN
BY
Burton & Parker
ATTORNEYS

Jan. 14, 1958    J. T. PARSONS ET AL    2,820,187
MOTOR CONTROLLED APPARATUS FOR POSITIONING MACHINE TOOL
Filed May 5, 1952                       7 Sheets-Sheet 3

INVENTORS
JOHN T. PARSONS
FRANK L. STULEN
BY
Burton & Parker
ATTORNEYS

Jan. 14, 1958  J. T. PARSONS ET AL  2,820,187
MOTOR CONTROLLED APPARATUS FOR POSITIONING MACHINE TOOL
Filed May 5, 1952  7 Sheets-Sheet 4

INVENTORS
JOHN T. PARSONS
FRANK L. STULEN
BY
Burton & Parker
ATTORNEYS

United States Patent Office 2,820,187
Patented Jan. 14, 1958

2,820,187

MOTOR CONTROLLED APPARATUS FOR POSITIONING MACHINE TOOL

John T. Parsons and Frank L. Stulen, Traverse City, Mich., assignors to Parsons Corporation, Traverse City, Mich., a corporation of Michigan Application May 5, 1952, Serial No. 286,162

23 Claims. (Cl. 318—39)

This invention relates to a method of and means for shaping and modifying work pieces and more particularly to a method of and means for automatically controlling machine tools, such as milling machines and the like, from media containing stored information such as cards or tape punched or otherwise modified for this purpose.

In the production and manufacture of machined surfaces, such as airfoil shapes, it is customary to use models or templates either as a guide for the machine tools or as a checking device for measuring the accuracy of the work as the machining operation progresses. This required the expensive practice of first constructing models or templates, or both, having an accuracy better than that required for the finished work. Such procedures are long and tedious, and the accuracy has been dependent upon the skill and care of the workmen.

Moreover, in the fabrication of two and three dimensional shapes, such as templates and models, it has been the practice to draft or lay out these shapes on the stock out of which the template or model is to be formed, locating a series of points on the stock and connecting these points with a smooth curve, usually using French curves. The connecting line through the points then serves as a guide to the machinist in working the surface to the line by manual means.

An important object of the present invention is to provide an improved method of and means for machining work pieces to obtain the desired geometrical characteristics and in such a manner that the human factor is substantially reduced if not entirely eliminated from the control of the moving parts of the machine.

Another important object of the invention is to provide a control system for a machine tool, such as a milling machine, which eliminates the need for the production of templates and models, and the elimination of tedious hand and mental operations heretofore required of the machine operator for accurately controlling tool motions.

Another important object of the invention is to provide an improved control system for controlling a machine tool, such as a milling machine, which automatically delivers input commands or orders to one or more moving parts of the machine, automatically compares the resulting output or movement of the part or parts with the command orders, and automatically terminates the movement of the part or parts when the input orders and the output results compare equally with one another.

Another important object of the invention is to provide a novel method of controlling a machine tool which utilizes calculated data in lieu of models, templates, and the like for controlling the moving parts of a machine tool.

Another important object of the invention is to provide an improved machine tool control system which is capable of accepting a series of data calculated to represent the tool positions required and to act in accordance with such data to produce the desired geometrical configuration.

A further important object of the invention is to provide a novel method of operating machine tools and the like from calculated positions of the moving parts of a machine tool in digital form and which corrects for the non-coincidence of the center of the cutter to its point of contact with the work.

In carrying out the objects of this invention, the desired shape is defined mathematically and by computing equipment (preferably of high speed caliber) to attain a very large number of relatively closely spaced apart points on the desired surface or curve to be shaped. These points are defined by their coordinates from given reference axes. In addition to obtaining the coordinates of a large number of these points this process utilizes computing equipment to translate these points so as to define a curve which represents the locus of a cutter center required to machine the original shape. This locus is defined by the transferred coordinates. These coordinates may either during the process of computation or subsequent thereto be transferred to information storing media, such as cards or tape, by punching holes in proper locations so as to represent the numbers. The first card may contain a number representing the abscissa of the first point of the cutter center locus and the ordinate of the first point of the cutter center locus. The second card may in a similar manner carry the abscissa and ordinate of the second point of the cutter center locus. Likewise for the third, fourth and subsequent cards. With this information available on the card record, a machine tool may be actuated to cause the cutter to travel along the developed locus, thereby cutting the desired shape.

Various other objects, advantages and meritorious features of the invention will become more fully apparent from the following specification, appended claims and accompanying drawings wherein:

Fig. 10 is a schematic view illustrating electric circuits for sensing the information recorded on punched cards and the like and for controlling the different operating axes of the machine in accordance with the information furnished;

Figure 1:
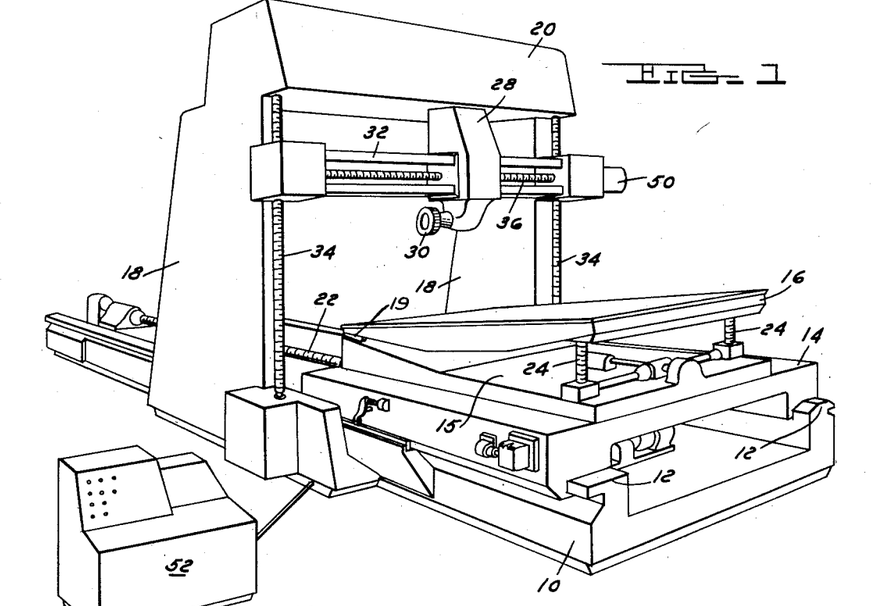
Fig. 1 is a perspective view of a machine tool in the form of a bridge type planer mill modified and controlled in accordance with this invention.
Figure 2:
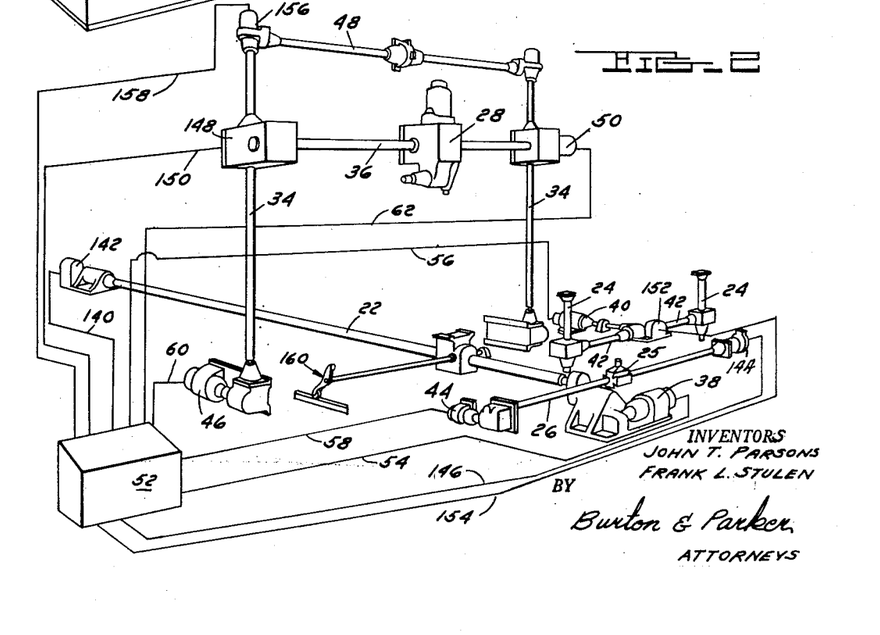
Fig. 2 is a skeleton perspective view of the operating parts of the planer mill illustrated in Fig. 1 and showing how these parts are connected to a central control unit spaced therefrom.

The invention is shown as applied to a conventional bridge type planer mill of the character illustrated in Figs. 1 and 2. Such a machine includes a fixed base or bed plate 10 having rails 12—12 upon which is longitudinally movable a travelling table 14. Mounted on the table and inclinably adjustable relative thereto is a universal fixture. This fixture is herein shown as divided into two superimposing components comprising a bottom member 15 and an upper member 16 customarily referred to as a sine plate. The lower member is pivotally mounted for swivelling movement about a vertical axis. The sine plate is hinged or rockingly supported at one end, as indicated at 19, for tilting movement about a horizontal axis and therefore capable of being adjustably inclined with respect to the table 14. The machine further includes spaced uprights 18—18 on opposite sides of the bed plate 10 and intermediate the length thereof. The uprights are bridged by a cross member 20 which co-operates with the uprights 18—18 to form the bridge of the mill.

The table 14 is moved longitudinally of the bed plate by means of a table lead screw 22 which is capable of driving the table to any desired position within specified limits. The two component parts of the universal fixture are capable of being swung about their respective axes. The sine plate 16 is tiltable by means of a pair of lead screws 24—24 interposed between the bottom member 15 and the unhinged end of the sine plate. The bottom member 15 of the fixture is swingable about a vertical axis at one end thereof by means of a traveling nut 25 threaded on a transversely extending positioning screw 26 and engaging the underside of the end of the bottom member opposite its pivotal axis.

Carried by the bridge of the milling machine is a cutter head 28 which carries a cutter indicated at 30. The latter is capable of engaging a work piece mounted on the sine plate 16 of the fixture. The cutter head together with the cutter is capable of joint movement horizontally cross-wise of the machine by means of a crosshead 32 having ways for guiding the cutter head for movement thereamong. The crosshead 32 is capable of vertical movement in order to raise and lower the cutter head and its tool. This is accomplished by mounting the opposite ends of the crosshead 32 upon two vertical positioning lead screws 34—34. The cutter head is controlled in its movement longitudinally along the crosshead 32 by a transverse positioning lead screw 36.

The various lead and positioning screws of the machine tool are separately controlled by power units in the form of electrical motors. As best shown in the skeleton view of Fig. 2, the power unit or motor for driving the table lead screw is indicated at 38. The motor for driving the two fixture vertical lead screws 24—24 is indicated at 40. The motor 40 is connected to two oppositely directed shafts 42—42 which are coupled to the lead screws 24—24. The motor for rotating the fixture transverse positioning screw 26 is indicated at 44. The motor for vertically adjusting the cutter head 28 is indicated at 46. It is coupled to the base of one of the vertical positioning shafts 34 and its power is conveyed to the opposite positioning shaft 34 by means of a connecting cross shaft 48. The latter is connected to the upper ends of the two vertical positioning screws 34—34 and is normally housed within the bridge 20. The motor for horizontally adjusting the cutter head 28 is indicated at 50 and is shown as mounted on one end of the crosshead 32.

All of these motors are separately connected by lead wires and cables to a control unit or cabinet designated by the reference character 52 which functions as an automatic control device for delivering command impulses to these various motors. Individually, the control cables leading from the unit 52 are designated by the reference characters 54, 56, 58, 60 and 62 and are connected respectively to the motors 38, 40, 44, 46 and 50.

Figures 3, 13:
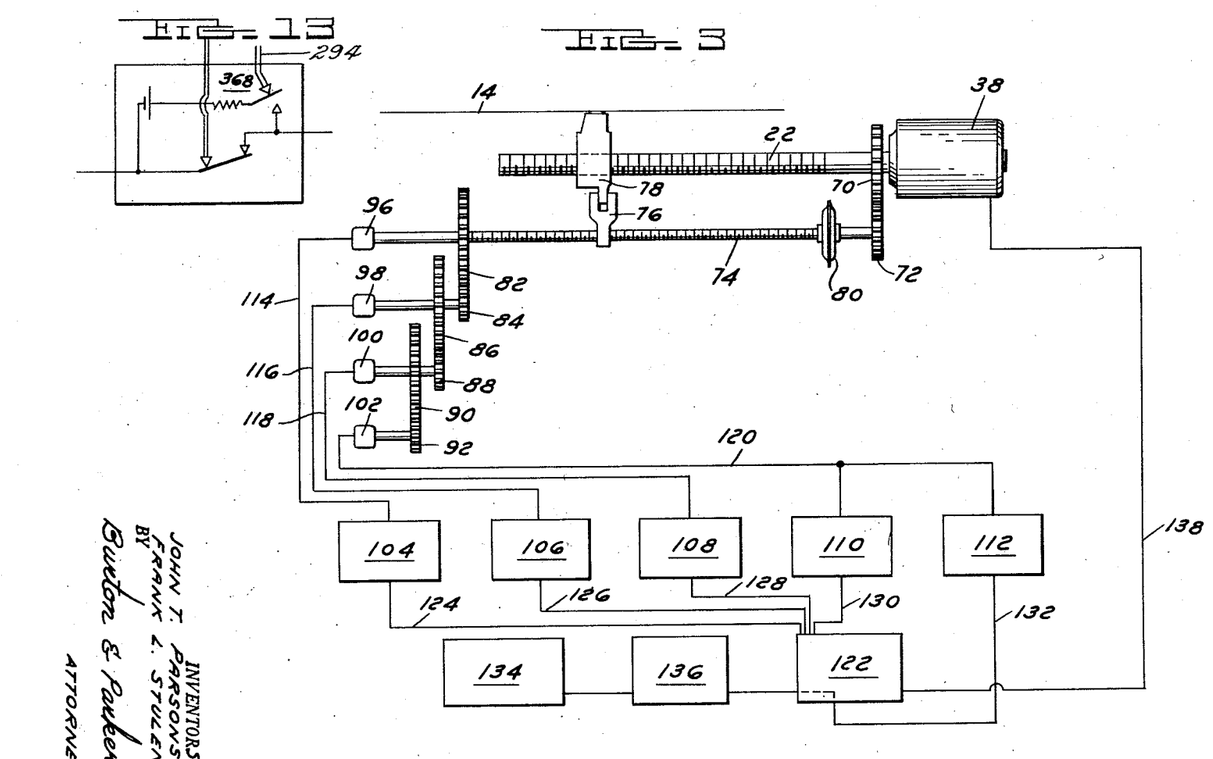
Fig. 3 is a combined schematic view of one of the driving mechanisms of the planer mill of Figs. 1 and 2 and a functional block diagram of the overall control system of the invention.
Fig. 13 illustrates the circuit arrangement of one of the storage relay switches in the storage unit.

Fig. 3 schematically illustrates how one of the movable parts of the machine tool is controlled from the device 52. For the purpose of illustration the drive for controlling the longitudinal movement of the table 14 is shown. As previously described the motor 38 drives the lead screw 22 which is operatively connected to the table. To the power screw 22 there is attached an unloaded instrument shaft 74. The gear between number 70 and 72 may be such as to drive the shaft 74 at a slightly greater speed of rotation than the lead screw 22. Carried by the shaft 74 is a follower member 76 which normally butts against the depending portion or lead screw nut 78 of the table to which the lead screw 22 is coupled. Although such means shown in Fig. 3 to drive shaft 74 is a slip clutch or fluid coupling 80 it is understood that other means may be used for this purpose for rotating the same at any desired rate with respect to the lead screw 22 so long as the rotation of the shaft is proportional and in the same direction as the lead screw.

The instrument shaft 74 drives a gear train 82, 84, 86, 88, 90 and 92, the reduction being commensurate with certain counting devices in the control unit 52 hereinafter mentioned. The gear trains drive a plurality of commutators, there being four shown herein at 96, 98, 100 and 102. These commutators through suitable electrical leads or cables are each connected to a counter in the control unit.

In the diagrammatic view portion of Fig. 3 the counting devices are indicated by the reference characters 104, 106, 108, 110 and 112. The first commutator 96 is connected by wire 114 to the counter 104. Similarly, the second commutator 98 is wired by line 116 to counter 106 and the third commutator 100 is connected by line 118 to the counter 108. The last commutator 102 differs from the other commutators and is connected by line 120 to the two counters indicated at 110 and 112. The counters are so designed and constructed that they will indicate motion of the machine part driven by the motor with which they are associated in decimal progression. For example, the counter 104 will indicate motion of the machine table from 1 to 9 inches; counter 106 will indicate .1 to .9 inch of table travel; counter 108 from .01 to .09 inch; and counter 110 will indicate from .001 to .009 inch. The last counter, namely, 112, will indicate in .001 inch units the incremental advance made by the preceding counters from their previous position.

Each counter 104 to 112 is electrically connected to a comparer 122 as represented by the lead lines 124, 126, 128, 130 and 132. Associated with the comparer unit 122 there is provided a card reader 134 which is capable of successively taking punch cards of the character illustrated in either Figs. 8 or 9 and reading the information punched thereon. This reader is electrically connected to a card number storage unit 136 which in turn is electrically connected to the comparer 122. A lead or cable 138 extends from the comparer 122 to the machine drive motor 38.

The electrical lead lines 114, 116, 118 and 120 of the commutator assembly of each feed shaft are housed in a common cable running from such shaft reading devices to the control cabinet 52 in which the card reader, counters and comparer of the control system are enclosed. A return information conveying cable 140 of this character is shown in Fig. 2 as leading from the housing 142 of the commutator assembly for the table lead screw 22. Similarly, the commutator assemblies for the remaining drive axes of the machine tool are electrically connected to the control cabinet 52. For example, the commutator assembly 144 on the end of the positioning shaft 26 is connected to the control cabinet by cable 146. The commutator assembly associated with the horizontal lead screw 36 for determining the transverse position of the cutter head 28 and which is enclosed in housing 148 is connected to the control cabinet by cable 150. The commutator assembly for indicating the extent of rotation of the vertical lead screws 24—24 is indicated at 152 and is connected by cable 154 to the control cabinet 52. The commutator assembly associated with the vertical lead screws 34—34 for determining the height of the cutter head is indicated at 156 and connected by cable 158 to the cabinet unit 52.

The control cabinet includes the card reader unit 134, comparer unit 122, the card number storage unit 136 and counter units 104 to 112 inclusive. These are all electrically connected together as hereinabove described and in such a manner that information such as on punched cards may be fed into the cabinet and stored and utilized to direct power to the machine tool for moving the parts thereof along their respective operating axes. The response of each axis to the information thus fed to it is returned by way of the commutator assemblies and connecting cables to the control cabinet and particularly into the comparer unit thereof. The comparer mechanism compares the input information against the output or response of the actuated part and when the two figures compare equally that particular part of the machine is stopped.

In the operation of the machine and its control system, a work piece is mounted upon the sine table 16 of the universal fixture. The five axes of the machine illustrated herein provide two angular motions of the fixture, a transverse and a vertical motion of the cutter head, and the table motion. These five basic motions permit cutting any desired straight line on the work piece. This arrangement also permits the position of the work piece and the cutter 30 to any desired location so that holes may be bored or so that a series of plunges can be made to the desired depths at specified locations to thereby cut away or remove the metal so as to delineate a surface which cannot be otherwise generated by straight line cuts. In general, the scope of the linear cuts that can be made on the work piece is bounded by the largest conical surface that can be generated by the double-pivoted fixture and which can be contacted at all points by the cutter. This maximum conical surface is a function of the travel obtainable on the five motions.

As previously explained, each positioning lead screw is provided with a commutator assembly and such that an electrical impulse is obtained for each fraction of a revolution of the screw with which the assembly is associated. Each impulse represents an increment of advancement of the controlled part along the given axis and in the example illustrated hereinabove each impulse represents an .001 of an inch movement of the part being driven by the screw.

In order to allow for manufacturing inaccuracies in the making of the screws, a conventional compensating cam and nut arrangement may be provided for correcting the action of each screw so that the actual lead per revolution or fraction thereof is constant throughout its entire length. Such compensating means is schematically illustrated herein at 160 for the table lead screw 22. It is understood that the remaining lead screws may have similar provisions for correcting any inaccuracies.

The desired position of the part of the machine driven by each lead screw is punched in a medium such as a card or tape. For a given cut as many lead screw positions must be defined as there are axes of controlled motions in the machine tool. In the illustrated embodiment of the invention there are five axes of control motion and the screw positions for such axes may be punched into one or more cards. Five separate cards, one for each lead screw, may be employed if desired. However, it is desirable from the standpoint of economy and speed to condense the punched information into a single card for a given position of the parts controlled by the five lead screws.

Such a punched card is inserted into the card reader 134 and is automatically read and the information punched thereon causes the rotation of one or more of the lead screws and moves the parts associated with such lead screws. As each part moves the electrical impulses from the contactor of the commutator assembly of each lead screw are fed to the comparer and counted. This count is continuously being compared to the card reading stored in card storage unit 136. When an exact comparison is obtained, the driving mechanism for each particular screw is stopped. The next card is then automatically read into the card reader and the process repeats itself. Each card represents a machine operation, which may be a linear cut or a positioning travel of one or more parts of the machine depending upon the character of the shaping operation to be made. A plurality of cards can be prepared and arranged in sequence and when fed into the card reader they effect a series of cutting operations for making the desired transformation on the work piece.

Figure 8:
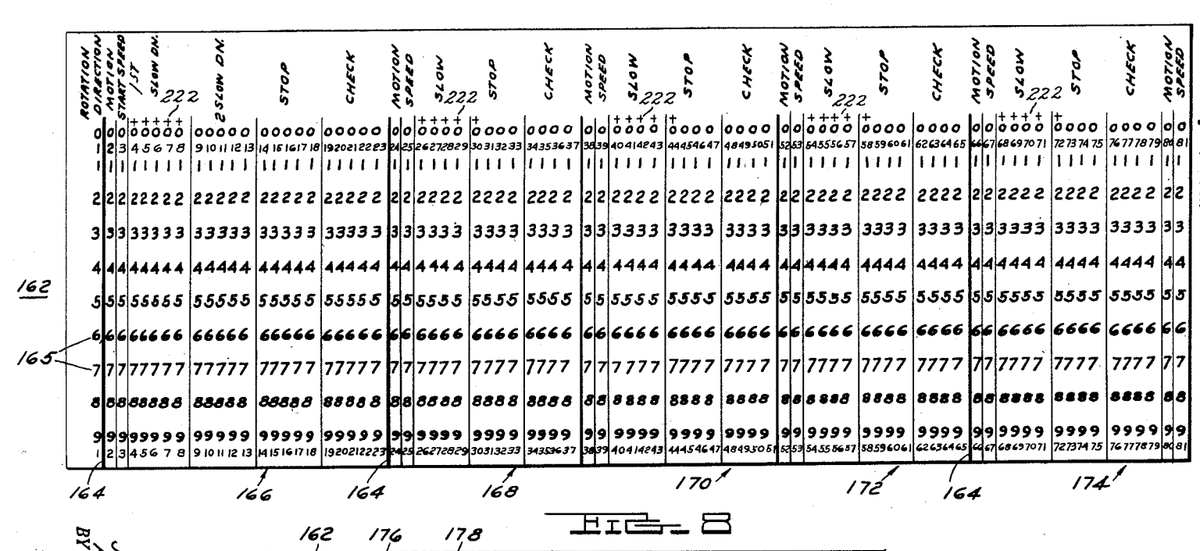
Fig. 8 is a view in plan of a card employed for the purpose of storing information for controlling the machine tool.

Fig. 8 is illustrative of a card intended to be punched and used in the card reader of the control cabinet 52. It is very much like conventional cards employed in business calculating and comparing machines. The card is generally designated by the reference character 162 and is designed so that it may take care of as many control axes as there are in the machine tool for which it is intended. In the present instance, card 162 is divided longitudinally into five different groups or sections, each separated from the other in Fig. 8 by a heavy black line 164 to clarify the sub-divisions of the card and being representative of one of the five axes of the machine tool disclosed herein. It is understood that the usual practice would be to omit the dividing lines 164 since they have no function as far as the card reader is concerned.

The single number column at the left margin of the card and designated by the reference character 165 may be used to set the direction of rotation of the spindle of the cutting tool. With reference to the larger sections between the dividing lines 164, the leftmost section of the card generally indicated at 166 and consisting of the columns 2 to 23, inclusive, is intended to control the axial motion of the spindle of the cutting tool. The next section 168 of the card may control the motion of the table 14. The next three sections 170, 172 and 174 govern the actions of the three remaining axes of the machine.

The columns inside the groups or sections are subdivided in a generally similar manner as indicated by the expressions along the margin of the card. Such expressions include the words "Motion," "Start Speed" or "Speed," "Stop" and "Check." The column designated "Motion" will when punched in a certain manner indicate the direction of movement of the part controlled thereby, whether a forward or rearward movement. The columns under the next subheading, "Start Speed" or "Speed," will when punched in a predetermined manner set the speed of the part under control. The table may have two or more slow down speeds and for such purpose the section 166 may be provided with two columns designated "First slow down" and "Second slow down." The numbers punched in either one or both of these columns will govern the positions of the cutting tool and the speeds when the first and second slow down motions are imparted to the tool. The remaining subdivision of each section are designated by the words "Stop" and "Check." The column under "Stop" is punched to designate the stopping position of the part under control. The "Check" subdivision is utilized to check the increment values during each cutting operation.

It is desirable in many instances to control the machine by slowing down any one of the different axes in the machine prior to the stoppage thereof to prevent overrunning of the parts. This is particularly true in the event any part of the machine is driven at a relatively high rate of movement. To slow down the movement of such parts in the machine it is desirable to add one or more secondary numbers lower in value than the true position number by a predetermined amount and to punch out such number in the card to step down the speed of movement of the part. For example, the first number may be .200" less than the desired value, the second number may be .100" less than the desired value with the third number being the desired position value. When a comparison is made in the comparer with the first number, a signal will effect a change to a lower speed of movement of the part. When a comparison is made in the comparer with the second number, a still lower speed of advancement is effected. Finally, as previously described, when comparison is made with the third and final value, the lead screw for the part in question is stopped.

Two or more speeds may be imparted to the machine part under control. For example, the table may have three speeds, its normal speed, its first slow down speed, and its second slow down speed. The remaining parts of the machine may have only two speeds as indicated on the card 162 in Fig. 8. At high rates of lead screw advance it may be desirable to count only every one-hundredth of an inch motion rather than every one-thousandth of an inch until the slow down signal occurs after which the counting may be made at one-thousandth of an inch.

To prevent errors in machine operation due to malfunctioning of the counting and card reading devices, it is desirable to incorporate certain safety features. A check, for example, may be continuously made on each lead screw contactor to safeguard against missing an impulse representing .001" in advancement. A satisfactory check of this operation may be obtained by incorporating a duplicate set of contacts on the same contactor disc and connected to the first set of contacts in such a manner so that if the impulse is not received simultaneously from both sets the machine will stop and show a signal. A check may be continuously made on the counter to assure proper counting. A check may be continuously made on the card reading device to assure proper sensing of the punched cards. The above two checks can be continuously made by incorporating in the card an additional number which represents the difference between the desired value of that particular card and the preceding card in the card sequence. In other words this additional number will represent the change in lead screw advancement between the two cards. Such a number may be punched in any one of the columns under the "Check" subdivisions of the card 162.

In addition to counting the impulses from zero position of the driven part so that its position is known from a reference line, a count may also be made of the movement of the driven mechanism from its previous position. In other words, two counts may be made, one representing the absolute position and the other representing the change in position. Each of these two counts are compared to their respective values on the card and if any but a simultaneous comparison is made, the machine is caused to stop and show a signal. In addition, a check may be made to insure against insertion of the cards in improper sequence. This may be accomplished by consecutively numbering the cards so that with proper electrical design of the card reader the machine will stop and show a signal in the event a card is read out of sequence. A special column or coded section may be provided on the card and punched to show the sequential relationship of that particular card with respect to the remaining cards in the sequence.

Figure 9:
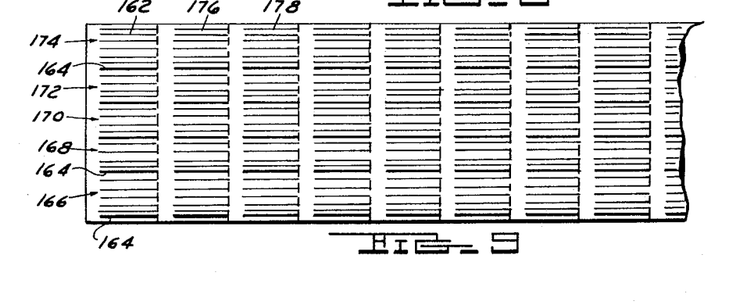
Fig. 9 is a view in plan of a series of cards such as illustrated in Fig. 8 joined end to end to form a ribbon or tape.

Fig. 9 illustrates a further adaptation of the stored information media and instead of separate individual cards signifying a different step in the cutting operation, all of these cards may be secured end to end to form an elongated ribbon or tape. This arrangement is shown in Fig. 9. A card such as shown in Fig. 8 at 162 is indicated by the corresponding number in Fig. 9. Secured in sidewise relationship to card 162 is another similar card 176 which may be punched to signify the position of the parts in the next cutting operation. Secured to the opposite side of card 176 is another card 178 which is punched to move the parts to their next position in the cutting operation. These cards may be hingedly connected in side to side relation in this manner and form a long continuous foldable series of cards. It is obvious that the stored information may be punched on tape in lieu of a connected series of punched cards and that the machine tool could be controlled from perforated tape instead of punched cards.

Figure 4:
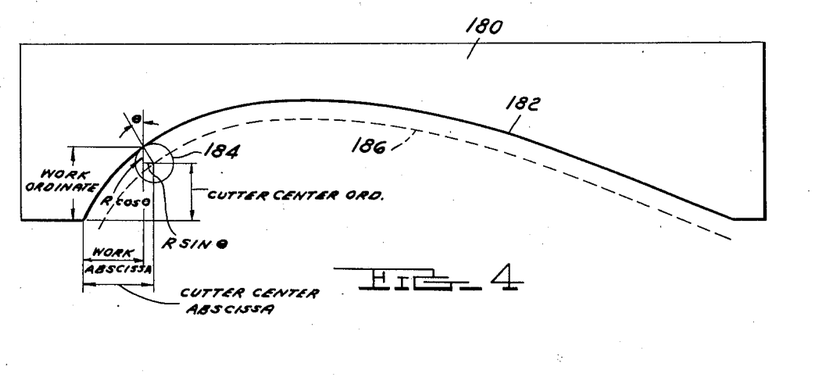
Fig. 4 is a diagrammatic view of the offset relation of the cutter axis to the point of tangency on a work piece.
Figure 5:
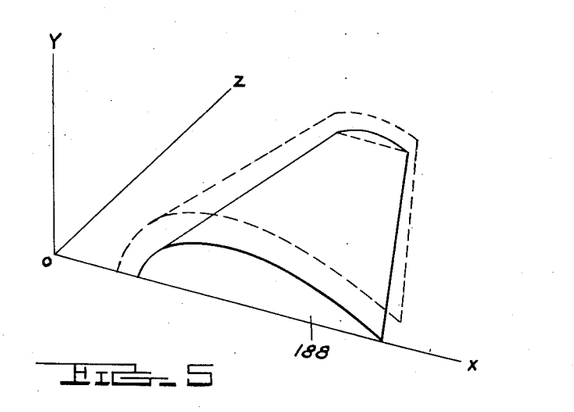
Fig. 5 is a perspective view illustrating the three dimensional problem involved in shaping a surface.

Figs. 4 and 5 schematically illustrate the application of the present invention to the shaping of two and three dimensional objects respectively. In Fig. 4, a two dimensional object such as a female template 180 is shown having an indented curved edge 182 formed by a cutter tool controlled in accordance with this invention. The cutter is represented by the reference character 184 and is shown assuming one of its cutter stations intermediate the opposite ends of the curved edge 182 and in tangential contact therewith. It will be assumed that the indented edge 182 of the template has already been formed and that the cutter 184 has been re-positioned at one of its stations for illustration purposes.

In the formation of the curved edge 182 of the template, the cutter 184 was controlled to move in straight lines from one cutter station to the next successive station. These stations may be determined mathematically, assuming the curve can be mathematically defined, or they may be calculated graphically from layout drawings. Preferably for the production of a template or model, or other precisely formed object, it is desirable to provide a number of closely related stations along a reference line such as the chord line of the curved edge to be formed. This is true of templates, models, air foil sections and other objects where accurately shaped surfaces must be provided. Knowing the diameter of the cutter it is possible to calculate the position of the cutter center at each station in order to bring its periphery into tangential relation with the planned line of cut. For each cutting operation performed in the example illustrated in Fig. 4, the center of the cutter is located on a line normal to each station on the chord line, and the center of the cutter is calculated along each station line from the reference chord line.

Referring to Fig. 4 it is evident that the point of tangency of the cutter at whatever station it is positioned, has what may be referred to as a "work ordinate" and a "work abscissa" with respect to a given reference point. However, because of the fact that the center of the cutter is displaced with respect to its periphery, the "cutter center ordinate" and "cutter center abscissa" differ from the "work" co-ordinates. It will be seen, therefore, that the "cutter center ordinate" equals the "work ordinate" minus $R \cos \theta$ and that the "cutter center abscissa" is equal to the "work abscissa" plus $R \sin \theta$ (where "R" designates the cutter radius).

Figure 6:
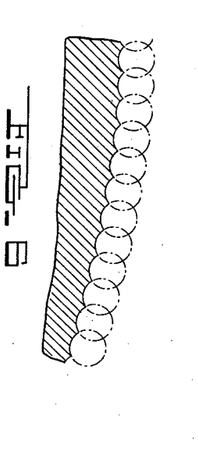
Fig. 6 is an enlarged fragmentary and sectional view showing the scalloping of a section of a work piece such as the section illustrated in Fig. 5 after the cutting operation.

In carrying out the invention, the recording media, such as the cards 162, may not only furnish the position of the machine part controlled with respect to a reference point or line but also provide the difference between each successive position or station of the part so moved. The first may be considered as the absolute position of the part and the second may be considered as the incremental position. In the example illustrated in Fig. 4, the co-ordinates of the cutter center for each station may be calculated from a fixed point on the machine or work object and these co-ordinates, expressed in fractions of an inch or otherwise are punched in a series of cards 162, each card bearing one of the cutting stations. Similarly, the incremental differences between each station may be punched on the cards, each card bearing a number representing the distance of travel between its particular station and either the preceding or following station. These absolute and incremental positions expressed in numbers are picked up by the card reader 134 and fed to the storage and comparer units 136 and 122 respectively. In the example illustrated in Fig. 4, as the cutter approaches the deepest part of the curved edge 182 each successive cut is deeper than the preceding cut. However, for the stations beyond the deepest point of the edge 182, each successive cut is shallower than the preceding one. The cutter stations along the reference chord line are preferably so closely related that each cut is made within the radial distance of the preceding cut. As a result, a series of scallops are formed on the work object such as illustrated in Fig. 6. The scallops of the edge are later reduced to a smooth curve by removing the material between the stations such as by hand filing, or otherwise, and in a manner to satisfy precision requirements. The loci or the path travelled by the cutter center is indicated in dotted outline at 186. This path is shown following the curvature of the edge 182 and in parallel relation thereto but it is understood that it would be a series of short straight line sections joined end to end and in stepped relation to one another.

In Fig. 5 there is illustrated an example of milling a linearly defined surface. This is an extension of the two dimensional problem illustrated in Fig. 4 to a three dimensional problem. It may be assumed that the object 188 illustrated in Fig. 5 is the wing section of an airplane. Being a three dimensional problem, more complicated expressions will be required to define the surface characteristics. The cutter center and the other parts of the machine are controlled so as to shape the air foil section illustrated. To accomplish this end, the co-ordinates of the opposite ends of the air foil sections are furnished. Knowing the diameter of the cutter and the co-ordinates of the opposite ends of the air foil section to be formed, it is possible to calculate the co-ordinates of the cutter center from a reference point such as the zero "0" in Fig. 5. Overlying the air foil section 188 illustrated in Fig. 4 is a dotted pattern representing in phantom the loci of the cutter center during the milling of the air foil section. At all times during the shaping of the object the cutter center is on a line normal to the generated surface and the loci of the centers wraps itself around the milled surface at a distance equal to the radius of the cutter.

Figure 7:
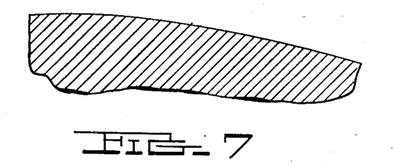
Fig. 7 is a similar enlarged fragmentary and sectional view but showing the surface of the work piece with the scalloped edges removed.

In the formation of such an object as the air foil section 188 illustrated in Fig. 5, not only will the cutter itself be adjusted between operating steps but the table 14 and sine plate 16 will be adjusted between each step in order to produce the taper in the air foil section. Normally, the air foil section or other object to be shaped will be placed on the sine plate 16 so that during table travel it will be moved parallel to its long dimension. Between each longitudinal movement, both the cutter and the sine plate will be adjusted slightly so that each cut will differ from the preceding cut. The result is that the whole upper surface of the air foil section will be scalloped as shown in Fig. 6. Fig. 6 shows the scallops in exaggerated condition. These scallops will generally be of the order of .002 inch high. The ridges left between each cut are later removed by hand filing or in any other suitable way to provide a smooth surface such as illustrated in Fig. 7.

Fig. 10 schematically illustrates the electric circuits for sensing the information recorded on a series of cards 162 and for controlling the various axes or lead screws of the machine in accordance with the information furnished. The cards 162 are stacked in proper sequence in a card reader 134 of conventional design. Brushes or other electrical contact means are provided in the card reader for detecting the information punched into the cards. Preferably several sets or banks of brushes are provided in the reader for contacting the cards as they are fed therethrough and these banks of brushes are arranged in sequential order so as to read sets of information in each card at a slightly different time.

In the schematic showing in Fig. 10, duplicate control systems for controlling the table lead screw and for controlling the horizontal or transverse lead screw of the cutter head are shown and correlated with assigned sections of a punched card 162. It is understood that similar circuits are provided for the remaining axes or lead screws of the machine, there being three more of such axes in the illustrated embodiment of the invention. These remaining axes are the cutter head vertical lead screw, the sine plate horizontal lead screw and the sine plate vertical lead screw. The separate circuits for each of these remaining axes duplicate those shown in Fig. 10 and for this reason they are omitted.

In Fig. 10 the power units or electrical motors for driving the table lead screw and the cutter head transverse lead screw are shown at 38 and 50. Motive power for operating these motors is derived from a source of electrical power indicated at 200. One current delivery line from the power source is indicated at 202 and as having a master switch 204 adjacent to the power source. The companion power delivery line from the source is indicated at 206 and is connected separately into the lead screw control circuits by branch lines 208. When the master switch 204 is closed the lines 202 and 206 supply current to the two motors 38 and 50, shown in Fig. 10, and to the remaining three motors, 40, 44 and 46 which are omitted from Fig. 10.

In each axis controlled circuit in Fig. 10 there is provided a portion of the comparer unit 122 and such portion is divided and represented by two rectangules or box outlines 122' and 122". The box representation 122' constitutes the absolute position comparer of unit 122. The box representation 122" constitutes the incremental position comparer of the unit 122. The two comparer sections 122' and 122" operate simultaneously and serve to compare not only each input information or command and the resulitng position assumed by the part but also compares the station or incremental advance of the part with the difference between two successive commands furnished by two sequential cards.

When a card 162 is fed into the card reader 134, the first bank of brushes therein detects the information punched into the card for controlling the direction of rotation of the cutter spindle. The information is punched in the card in the leftmost single number marginal column 165 as previously described. Whichever brush is activated by contact with a punched hole in this column, an impulse will be sent over cable 210 to a spindle rotation control (not shown). The signal will cause the spindle to rotate in one direction if a "0" is punched and will cause the opposite direction of rotation if a "1" is punched.

In the first bank of brushes are brushes which make contact with the columns of the card 162 marked "Motion." For the table lead screw the control impulses for the motion are transmitted over cable 212 to a reversing control device 214. If a "0" is punched in the motion column of a given axis, the reversing control 214 is caused to be set for forward motion. If a "1" is punched in the motion column control 214 is caused to be set for reverse motion. This impulse from the motion column is also transferred through cable 216 and sets up the lead screw counter for the particular shaft in question for counting (when counting impulses occur) either in a plus or minus direction. It is thus apparent that the direction of rotation of each lead screw is determined from the coded number punched out of the motion column of the subdivision of the card relating to the lead screw and this direction of rotation is fed into the absolute comparer 122' to set up the counters therein for counting in the proper direction.

The first bank of brushes engaging the card also senses the punched holes in the "Slow down," "Stop" and "Check" columns of each of the axes of the machine and through separate channels transmits this information to the absolute storage and comparer 122' and also to the incremental storage and comparer 122". In this manner the storage relays of these units are set to correspond to the numbers punched in the card. The separate circuits for the "Slow down" and "Stop" columns are bundled into one cable designated 218 and led to the absolute comparer 122'. The circuit for the "Check" column is conducted by channel 220 to the incremental storage and comparer 122".

The first bank of brushes also senses the punches in a sequence control pattern provided in each axis subdivision of the card 162. Each such pattern is indicated by the reference character 222 and is shown on the card in Fig. 8 as a row of cross marks. In order that each axis might be separately positioned in time, each sequence control pattern contains as many punchable spaces (herein identified as cross marks) as there are machine axes. The location of one or more punched holes in the control pattern for each axis determines the time of operation of the machine axis with respect to the remaining axes. Separate circuits lead from the brushes of the reader for sensing the pattern punches and are led by cable 223 to a sequence controlling switching mechanism generally indicated at 224 in the control circuit for the particular axis.

In each switching mechanism 224 there are a plurality of movable switch contact elements. It is preferred to use as many of these contacts as there are machine axes to be controlled. In the illustrated embodiment of the invention, five axes are provided and accordingly in each switch mechanism 224 there are five movable contacts. These are indicated at 226, 228, 230, 232 and 234. Depending upon which of these contacts are closed, the axis controlled thereby will be operated either ahead of or at the same time or after one or more of the other axes of the machine. These contacts are moved to closed position by the pattern reading circuits conducted from the reader by the cable 223. The particular form of control for each contact may be any suitable means such as an electro magnet 234 associated with the contact and capable on energization to move the contact to closed position.

In the example illustrated in Fig. 10, the first and second axes of the machine relating to the table leadscrew and the transverse lead screw of the cutter are to be positioned first. These are followed by the third and fourth axes of the machine relating to the vertical lead screw of the cutter and the transverse lead screw of the sine plate. The fifth and final axis which relates to the vertical lead screw of the sine plate is positioned last. To accomplish this, the first and second contacts 226 and 228 are closed for the first and second axes by punched holes in the first and second positions of the rows 222 in the sequence control patterns for the table lead screw and the cutter transverse lead screw. Similarly the third and fourth contacts 230 and 232 are closed for the third and fourth axes by punched holes in the third and fourth positions of the rows 222 in the sequence control patterns for the cutter vertical lead screw and the sine plate transverse lead screw. Lastly, the fifth contact 234 is closed by punching out the last position of the row 222 in the sequence control pattern for the sine plate vertical lead screw.

Fig. 10 shows the closed position assumed by the contacts 226 and 228 for the table and transverse cutter control circuits; and the closed position of the contacts 230 and 232 for the vertical cutter control circuit. It is understood that the contacts 230 and 232 in the control circuit for the sine plate horizontal lead screw are closed; and that the contact 234 in the control circuit for the sine plate vertical lead screw is closed. In whatever sequential order is arranged for the machine axes, the cutting operation will be performed during the last axis to be positioned. In the example set forth, the actual cutting operation will take place as the sine plate is moved vertically by its vertical lead screws 24—24.

In the movement of the card through the reader, a second set of brushes is arranged to contact the "Start speed" and "Speed" columns of the cards and cause a start speed switch 236 in the control circuit affected to index from its "off" position where it is in contact with the terminal 238 through a speed relay control 240 which governs the speed of rotation of the particular axis under control. As schematically shown in Fig. 10 the speed relay 240 in each axis control circuit is subdivided into three parallel branch circuits having different electrical resistances, the degree of power supplied being inverse to the amount of resistance in each branch circuit. The three branch resistance circuits are identified by reference characters 242, 244 and 246, and they join a common cable 248 leading to the lead screw motor controlled thereby. The stepping of the speed switch from one branch circuit to the other is controlled by a sensing circuit 250 connected to the brushes which read the speed columns of the punched cards. The sensing circuit is provided with an electrical stepping device 252 for moving the switch 236 in accordance with the number of impulses received.

If a "0" is punched in the speed column of a card, one impulse is transmitted through the sensing circuit 250 to the stepping device 252 moving the switch contactor 236 from its "off" position to the first highest speed indicated by the circuit 242. Similarly, if the "0" and the "1" are punched in the speed column, two impulses are received moving the switch contactor 236 to the second speed indicated by circuit 244, and if the "0," "1" and "2" are punched, three impulses are received moving the switch 236 to the third or lowest speed circuit.

When all five axes speed switches 236 are thus set and the proper contact in the sequence control switching mechanism closed current will be delivered through the circuit 248 to drive the lead screw motor associated with the control circuit. The screw shaft driven by the motor will act through its respective lead screw counters 104, 106, 108, 110 and 112 to feed back the absolute and incremental positions of the machine part to the comparer sub-sections 122' and 122" in the control circuit. These information feed back circuits were previously described in connection with Fig. 3 and are identified by reference characters 124, 126, 128 and 130. In Fig. 10 a single cable 254 represents these four feed back circuits. The remaining feed back circuit 132 to the incremental comparer is so identified in Fig. 10. When the counters in the absolute comparer section 122' agree with the first slow down value in the storage, an impulse is received by a stepping relay 256 through channel 257 causing contactor of speed switch 236 to position to the next branch speed circuit 244 of the speed relay control 240. If the starting speed of the lead screw is set for the second speed provided, then the card has no first slow down speed punched and the switch 236 will position from the second speed to the third speed upon receipt of an impulse from channel 257. Similarly if the starting speed is set on the third or lowest speed, then there will be no slow down speeds punched in the card.

The card 162 shown in the example of Fig. 8 provides two slow down speeds for one axis, namely the table lead screw axis, and one slow down speed for each of the remaining four axes although their speed control switches 236 may have three speed positions. The card or other information record medium can obviously be increased to allow for two slow down speed values for each of the remaining four axes.

As the lead screw motors proceed on those axes having the first contact 226 of the sequence switch 224 closed, the speed switch 236 steps to a new and slower speed each time the stepping relay 256 receives an impulse until it reaches the third speed position. A delay device 258 is incorporated in a channel 260 connecting the several speed circuits 242, 244 and 246 with the absolute comparer 122'. This delay device opens the circuit 257 to the stepping relay 256 for a short period after an impulse is received and speed switch 236 makes one step. This is provided in order to prevent switch 236 from immediately stepping again due to a possible equality or comparison of input and output still existing in comparer section 122' which may not be thrown out of comparison by the motor the instant the switching is made. The final impulse for stopping the machine part will occur when comparison is made between the stop number in the storage of the comparer unit 122 and the instrument lead screw counters or when comparison is made between the increment number in storage and the increment counter 112. If both the absolute and incremental comparison occur simultaneously, as required, the current flow in the circuitry will be normal and the system will accept and read the next punched card.

Checking and warning circuits are provided for assuring distribution of the proper signals and in the event of error or malfunction for stopping the operation and indicating the general location of the trouble. Associated with the master switch 204 is an error checking circuit 262—264 including an electromagnet 265 operatively related to the master switch and a vacuum tube balancing circuit 266. The latter is also connected by circuit 268 with the absolute and incremental comparers 122' and 122" and the contact 238 at the "off" position of the speed switch contactor 236. If the absolute and incremental comparers are out of comparison, the resulting unbalance causes the vacuum tube circuit 266 to activate the error checking circuit and energize the electromagnet 265 and open the master switch.

For example, if only one comparison occurs, such as in the absolute comparer only, the unbalance between the two comparers will close the circuit 262—264. This circuit has an audible or visual indicator 268 therein which operates when the circuit is closed. The closing of circuit 262—264 will open the master switch stopping further operation of the machine. When speed switch 236 is in "off" position, a visual indicator 270 will operate if the absolute comparer storage section 122' is conducting and a visual indicator 272 will operate if the incremental comparer section 122" is operating. This will serve to indicate which of the two comparer sections is not functioning.

When the speed switch 236 indexes to the "off" position it engages contact 238 as previously described. This contact is in circuit 268 leading to the comparer section 122' and 122". Circuit 268 is connected by channel 274 to a circuit 276 which operates a motor 278. The latter drives a stepping shaft 280 for operating the sequence control switches 224. This stepping shaft 280 is common to all of the five sequence control switch mechanisms 224 and in each mechanism drives a rotary member 282. This member is arranged to sweep the contacts 226, 228, 230, 232 and 234 in sequence, as is evident in Fig. 10.

If two impulses are obtained simultaneously in the circuit 276 for the shaft motor 278 from two machine axes reaching their respective "stop" positions simultaneously, a unit 284 senses the increased impulse received and closes momentarily a contact and causes the circuit 286 with which it is associated to add an impulse so that the circuit 276 effectively obtains two impulses. The unit 284 can be arranged to add two impulses or more if more axes are to be operated simultaneously and there is a chance of receiving their stepping impulses simultaneously. At the time the circuit 276 is delivering current to operate the sequence switch mechanisms a device indicated at 288 breaks the circuit 276 so that the circuit discontinues conducting after delivering its impulse.

In this example, when the first and second machine axes have delivered their impulses to the stepping shaft 280, the third and fourth axes begin operations since their sequence switch mechanisms 224 are closed on the third and fourth contacts 230 and 232. When the third and fourth machine axes deliver their impulses, the stepping shaft 280 steps all sequence switch mechanisms to the fifth or final position permitting the fifth machine axis to proceed. When this fifth machine axis delivers its impulse to operate the stepping shaft 280, the rotary members 282 of the sequence switch mechanisms 224 return to their first position. In so doing, contact point 290 of each sequence switch mechanism is engaged by the rotary member 282. This contact is in a circuit 292—294 leading to the comparer unit 122. This last circuit functions as a zeroizing circuit and when activated by engagement between the rotary switch member 282 and contact 290, it clears the numbers stored in the absolute comparer 122', clears both the number and counter circuits of the incremental comparer 122" through channel 298, opens all the contacts of the sequence switch mechanisms 224 through channel 300, actuates device 288 through channel 302 to close circuit 274, and indexes the card reader through channel 304 to cause the reader to sense the next succeeding card representing the next cutting operation of the machine tool.

Figure 11:
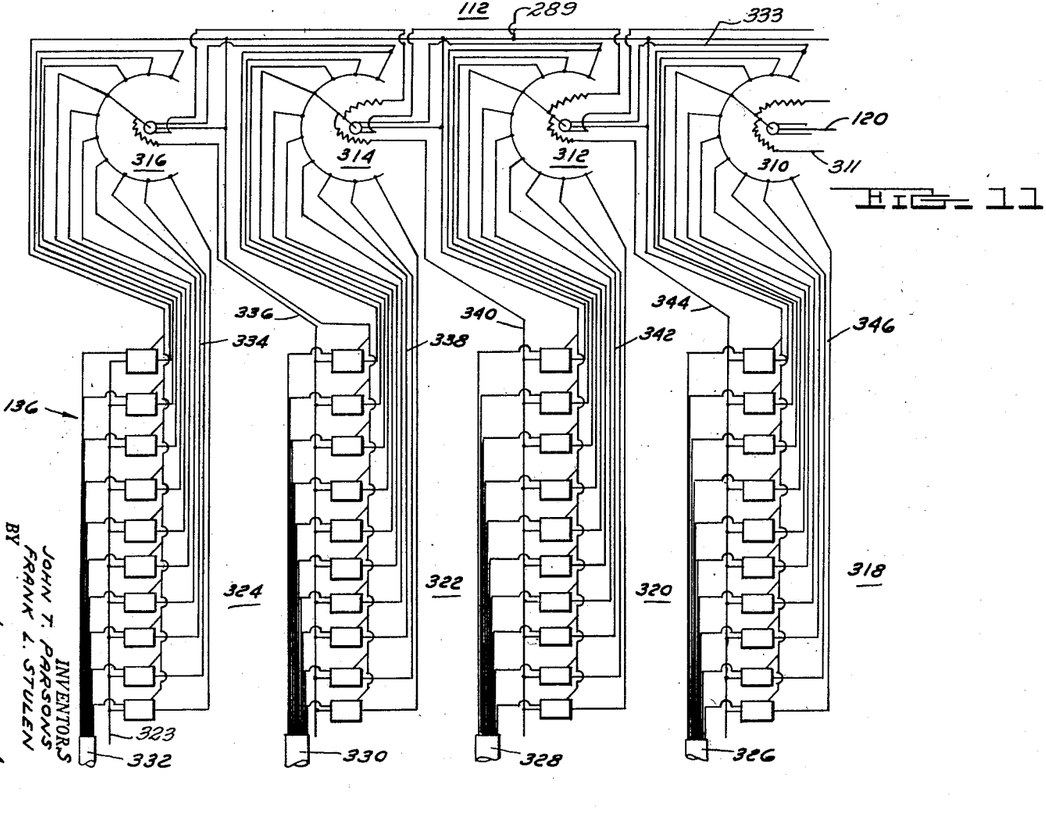
Fig. 11 schematically illustrates the operating relation existing between the increment counter and the storage and comparer units.

Fig. 11 schematically illustrates the operating relation existing between the increment counter 112 and storage comparer unit 136. The feed back impulses from the gear train commutator 102 are conveyed by channel 120 to the increment counter 112. In the counter unit are a plurality of stepping switches indicated at 310, 312, 314 and 316. These stepping switches are operated in series and are arranged to step one unit for each ten units of the immediately preceding switch. The rotary member in each stepping switch assembly is arranged to complete its revolution after ten steps of advancement have been made. In other words, after the stepping switch 310 has completed one revolution, it causes the stepping switch 312 to operate one step. Associated with each stepping switch are a bank of relay switches. The first bank of relay switches associated with the stepping switch 310 is indicated at 318. Sequentially, the banks of relay switches for the remaining switches 312, 314 and 316 are indicated respectively at 320, 322 and 324. The relay switches in these banks are energized by impulses received from the card reader over channels 326, 328, 330 and 332 to represent the increment of movement to be made from the preceding position or station. These channels 326 to 332 inclusive are housed in the common cable 220 of Fig. 10.

In the operation of the increment counter, the stepping switch 310 is caused to move from the initial position of .000 to .001 after receipt of the first impulse and then to .002 position with the receipt of the second impulse, and so on until it completes ten stepping movements. As it receives its tenth or final impulse for completing its revolution, stepping switch 310 transmits an impulse to the next succeeding stepping switch 312 and causes it to move from a .00 position to a .01 position. A connecting impulse delivery channel between the two switches is indicated at 333. In a similar manner the second revolution of stepping switch 310 will cause the stepping switch 312 to position at .02 position and so on until the latter completes ten stepping positions. This will cause an impulse to be transmitted to the next adjacent stepping switch 316. The stepping switches operate in this fashion from one end to the other end of the series.

The relay banks 318 to 324 inclusive were previously energized by impulses received from the card reader. If the increment of movement from the previous position or station of the machine part is 0.485, then the card reader will cause relay "0" of bank 324 to close, relay 4 of bank 322 to close, relay 8 of bank 320 to close and relay 5 of bank 318 to close. When the stepping switches 310 to 316 have been caused to index to the position 0.485 which will occur when the movement is the same as that figure, then a circuit is completed through channels 323, 334, 336, 338, 340, 342, 344, 346, 311 which constitutes part of the circuitry of the storage comparer unit 136. The channel from 323 to 311, through 334, 336, 338, 340, 344 and 346 is that part of comparing circuit 257, 236 and 256 which passes through incremental comparer 122″ and is also that part of the comparing circuit 238 which passes through incremental comparer 122″, thence through indicator 272.

Figure 12:
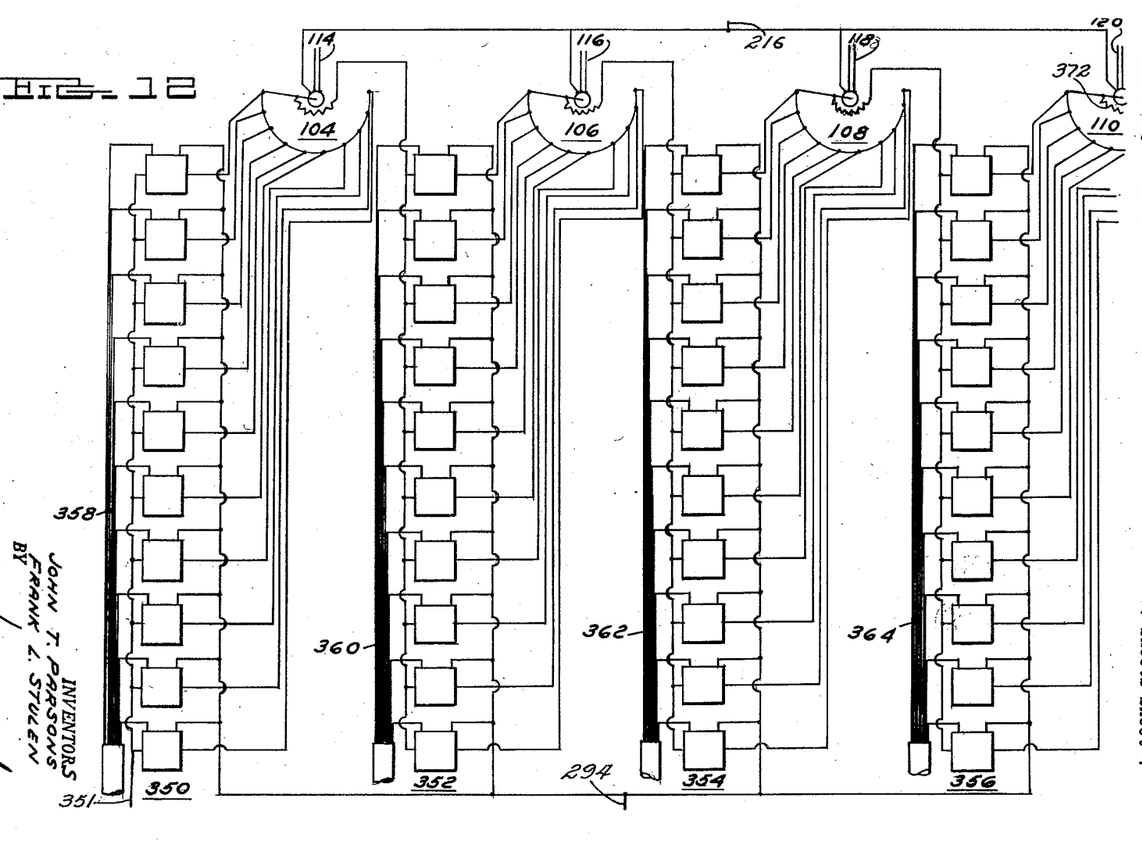
Fig. 12 schematically illustrates the operating relation between the absolute position counters and the storage and comparer units.

Figure 12 illustrates schematically the relationship of the counters 104, 106, 108 and 110 with the storage and comparer unit 136. The counter units receive impulses over channels 114, 116, 118 and 120 from the commutaters 96, 98, 100 and 102 associated with the controlled lead screw. The setting of the switches in these counters represents the position of the controlled axis from a reference point.

In the card storage unit 136 there are provided a number of banks of relay switches indicated in Fig. 12 at 350, 352, 354 and 356. The relays in these banks receive impulses from channels 358, 360, 362 and 364 respectively from the card reader. These four channels correspond to the main channel 218 of Fig. 10.

If, as an example, the "first slow down" number is 8.785, the "second slow down" number is 8.885, and the "stop" number is 8.985, then an impulse over channel 358 will cause the relay No. 8 in the bank 350 to close. An impulse over channel 360 will cause relays Nos. 7, 8 and 9 in bank 352 to close, an impulse over channel 362 will cause relay No. 8 in bank 354 to close and an impulse over channel 364 will cause the relay No. 5 in bank 356 to close.

A detail of one of the relay switches is shown in Fig. 13 and includes an electromagnetic coil 368 which operates to hold the relay in closed position. When the clearing channel 294 receives an impulse the coils 368 in each of the holding relays is momentarily de-energized which causes these relays to open. Only four banks of relays are shown in Fig. 12 but it is understood that the number of relay banks may be increased to handle additional digits representing larger motions. A total of five banks would be used to match the condition shown in Fig. 8.

As the lead screw for the particular axis under control progresses, the counter impulses are received over channels 114, 116, 118 and 120 to the counter switches 104, 106, 108 and 110 respectively, causing the switches to index one position for the impulse received. In this manner the switch positions represent the position of the controlled axis from a reference point. When the position so indicated by the switches agrees with the "first slow down" number in the relay banks, an impulse is transmitted from channel 351 through the circuitry of the relays and switches to channel 372. Similarly, an impulse is transmitted through the circuitry from channel 351 to channel 372 when the switches agree with the "second slow down" and with the "stop" positions of the relay banks. The input channel 351 corresponds to absolute comparer 122′ and input channels 257 and 268 of Fig. 10. An output channel 372 corresponds to output channels of 122′ of Fig. 10 which pass through indicator 270 and delay unit 258.

What we claim is:

1. A system for controlling the movement of a plurality of parts of a machine tool each of which is movable along a separate path in order to vary the relative position of a workpiece and a tool acting on the workpiece, a record containing an instruction for each part setting forth the desired distance for moving the same from a given position to a new position, said record further containing an instruction setting forth the order in which the parts will be moved, separate means for moving each part along its respective path, means for sensing the distance and the order instructions for each part set forth on the record, means responsive to said sensing means and controlling each part moving means to effect movement of its respective part to its new position, and means responsive to said sensing means and permitting movement of any of said parts only after all parts earlier in the instructed order have moved to their new positions.

2. A control system for a machine having a work supporting member and a tool member and further having means including a driving motor for moving one of said members relative to the other to cause the tool member to shape work on the supporting member, comprising means for sensing records each containing a first instruction for moving one of said members a first multiple unit of distance from a reference point to a first new position and a second instruction for moving said one member a second multiple unit of distance to a second new position, speed selector switch means for controlling energization of said driving motor, means responsive to said sensing means for actuating said speed selector switch means to energize said driving motor and move the member identified on the record at a predetermined speed to said first new position, means responsive to the movement of the member thus controlled and operative when the controlled member reaches said first new position for actuating said speed selector switch means to reduce energization of said driving motor, whereby the controlled member is thereafter driven at a reduced speed to said second new position.

3. A control system for a machine having a work supporting member and a tool member and further having means for moving one of said members relative to the other member to cause the tool member to shape work on the supporting member, comprising a plurality of records each containing an instruction for moving one of said members to a predetermined position with respect to a given reference point, each of said records also containing an instruction representing the incremental movement of said one member from the position of the previous record, means for sensing the instructions on each record and for storing a first member representative of the absolute position of said one member relative to said reference point and a second number representative of the incremental change in position of said one member, means responsive to said sensing means for moving said one member to said absolute position by comparing the position of said one member with said first stored number, and means for indicating when the incremental movement of said one member does not equal said second stored number.

4. A control system for a machine having a work supporting member and a tool member and further having means for moving one of said members relative to the other, comprising a plurality of information storing records each having spaced areas thereon representing an instruction for moving one of said members a predetermined distance from a given reference point, means for sensing said areas on each record and operable to control said member moving means to cause the latter to move the member identified on the record in accordance with the sensed instruction, means for successively feeding the records to said sensing means in a predetermined order, and means for sensing any out of order relation of the records to one another and for stopping the operation of said member moving means when such condition is sensed.

5. A control system for a machine having a work supporting member and a tool member and further having means for moving one of said members relative to the other, comprising a plurality of information storing records each having first areas thereon representing an instruction for moving one of said members a predetermined distance from a given reference point and having second areas thereon representing the desired sequence of instructions for said member moving means, first sensing means for sensing said first areas on each record and operable to control said member moving means to cause the latter to move the member identified on the record in accordance with the sensed instruction, means for feeding the records to said first sensing means in the order of said desired sequence, and second sensing means for sensing said second areas on each record and operable to stop the operation of said member moving means when any out of order relation of the records to one another is sensed.

6. In a control system for a machine having a work supporting member and a tool member and further having means for moving one of said members relative to the other and along a plurality of different axes, a plurality of information storing records each having areas thereon representing an instruction for moving one of said members to a predetermined position with respect to a given reference point, means for sensing said areas on each record and operable to control said member moving means to cause the latter to move the member identified on the record to the sensed position, means for successively feeding the records to said sensing means in a predetermined order, and means for sensing any out of order relation of the records to one another and for stopping the operation of said member moving means when such condition is sensed.

7. A control system for a machine having a work supporting member and a tool member and further having means for moving one of said members relative to the other and along a plurality of different axes, comprising a plurality of information storing records each having first areas thereon representing in decimal form the coordinates of a predetermined position with respect to a given reference point and having second areas thereon representing the desired sequence of positions of said members, first sensing means for sensing said first areas on each record and operable to control said member moving means to cause the latter to move the member identified on the record to the position indicated on the record, means for feeding the records to said first sensing means in the order of said desired position sequence, and second sensing means for sensing said second areas on each record and operable to stop the operation of said member moving means when any out of order relation of the records is sensed.

8. A control system for a machine having a work supporting member and a tool member and further having means including a main lead screw for moving one of said members relative to the other, comprising means for supplying numerical data to the control system, means for driving said one member through said main lead screw in accordance with the numerical data supplied by said last named means, measuring means independent of said main lead screw for measuring the movement of said one member, and means for stopping movement of said one member when the measured movement of said one member equals the numerical data supplied.

9. A control system for a machine having a work supporting member and a tool member and further having means including a main lead screw for moving one of said members relative to the other, comprising a record having spaced areas thereon representing in numerical form the desired extent of movement of said one member, means for sensing said spaced areas on the record, means responsive to said sensing means for driving said one member through said main lead screw in the direction to complete the desired extent of movement, measuring means independent of said main lead screw for measuring the movement of said one member, and means for stopping the movement of said one member when the measured extent of movement of said one member equals the desired extent of movement.

10. A control system for a machine having a work supporting member and a tool member and further having means including a main lead screw for moving one of said members relative to the other, comprising a record having spaced areas thereon representing in numerical form the desired extent of movement of said one member, means for sensing said spaced areas on the record and storing said desired extent of movement, means responsive to said sensing means for developing an electrical control signal, means responsive to said electrical control signal for driving said one member through said main lead screw in the direction to complete said stored extent of movement, measuring means independent of said main lead screw for measuring the movement of said one member and developing a corresponding electrical feedback signal, and means for comparing said electrical signals and stopping the movement of said one member when the measured extent of movement thereof equals the stored extent of movement.

11. A control system for a machine tool having a movable part effective upon movement to vary the relative position of a work piece and a cutting tool acting on the work piece, comprising means for storing on a record the desired extent of movement of the part, means for sensing the record and initiating movement of the part in the direction to complete said stored extent of movement, means for continuously measuring the position of the part as it is moved and comparing it with said stored extent of movement, means responsive to said sensing means for slowing down the rate of movement of the part as the actual position of the part approaches the stored extent of movement, and means for stopping the movement of the part when the measured extent of movement of the part compares equally with the stored extent of movement.

12. A control system for a machine tool having a plurality of parts independently movable along different axes, comprising record means having spaced areas thereon indicating in numerical form the direction and the distance it is desired to move each of said parts, means for sensing said spaced areas on the record and storing said direction and distance indications, means responsive to said sensing and storing means for automatically and simultaneously moving said parts in the direction and the distance thus stored, counter means, means for continuously adjusting said counter means as said parts are moved the desired distances, means for comparing said counter means with the stored movements of said parts, and means for stopping the movement of said parts when movement thereof compares equally with the stored movement therefor.

13. A control system for a machine having a work supporting member and a tool member and further having means for moving said work supporting member and for producing relative movement between said members along a predetermined cutting path, comprising record means having spaced areas thereon representing in numerical form a first instruction for positioning said work supporting member with respect to said cutting path, and a second instruction for moving one of said members along said cutting path, said record also having spaced areas thereon representing the sequence in which said instructions are to be carried out, means for sensing said spaced areas on the record, first control means responsive to said sensing means for positioning said work supporting member in accordance with said first numerical instruction, second control means responsive to said sensing means for moving one of said members along said cutting path in accordance with said second instruction, and sequence control means responsive to said sensing means for controlling the sequence of operation of said first and second control means.

14. In a machine having a work supporting member and a tool member and provided with means for positioning said work supporting member and for producing relative movement between said members along a predetermined cutting path, a control system for automatically shaping work on said work supporting member to approximate a curvilinear surface configuration by means of a series of straight line cuts, comprising record means having first spaced areas thereon representing in digital form the coordinates of said work supporting member with respect to a given reference point to position work on said work supporting member in proper relation to said cutting path for each of said straight line cuts and second spaced areas thereon representing in digital form the coordinates of the center of said tool member with respect to a given reference point, means for sensing said first and second spaced areas on the record, first control means responsive to said sensing means for automatically positioning said work supporting member in straight line cutting relation to said cutting path in accordance with said first spaced areas on the record, and second control means responsive to said sensing means for automatically moving one of said members along said cutting path in accordance with said second spaced areas on the record to effect said straight line cuts.

15. A control system for a machine having a work supporting member and a tool member and further having means for moving one of said members relative to the other member, comprising record means containing a first instruction for moving one of said members to a predetermined position with respect to a given reference point and a checking instruction related to said first instruction, means for sensing said first instruction and said checking instruction on said record means, means responsive to said sensing means for moving said one member to the position represented by said first instruction, and means jointly responsive to movement of said one member and to said sensing means for comparing the actual movement of said one member with said checking instruction and operative upon completion of movement of said one member to provide an error indication if the actual movement of said one member is not in predetermined correlation with said checking instruction.

16. A control system for a machine tool having a plurality of parts independently movable relative to different axes, said system being adapted for use with record means having separate numerical coordinate defining instructions thereon each directing movement of one of said parts a predetermined distance relative to one of said axes; comprising sensing means controlled by said record means for reproducing and storing all of said separate numerical coordinate defining instructions; a plurality of separate drive means each controlled by one of said stored coordinate defining instructions for automatically and concurrently moving said plurality of parts relative to said different axes in accordance with the instructions; a plurality of part position indicating means each individual to one of said parts; a plurality of control means each controlled by one of said parts for continuously adjusting the related position indicating means to successive settings in accordance with the actual movement of said one part relative to its axis, said plurality of control means operating concurrently to adjust said plurality of part position indicating means to settings representing the movements of said parts relative to said different axes; comparing means for continuously and concurrently comparing the successive settings of all of the part position indicating means with the stored instructions, the successive settings of each of the part position indicating means being continuously compared with the related stored instruction; and means controlled by said comparing means for stopping movement of said parts when the distances actually moved by said parts relative to said axes equal the movements relative to said axes directed by the reproduced instructions.

17. A control system for a machine tool having a plurality of parts independently movable relative to different axes and adapted to use record means for storing a plurality of separate groups of numerical instructions; each of said groups including a plurality of instructions each directing a predetermined movement of one of said parts relative to its axis, record reading means including record feeding means and record sensing means, said record sensing means being operable to sense said stored instructions on said record means and to establish coexisting registrations of all of the numerical instructions in a first one of said groups, a plurality of part moving means each adapted to move one of said parts in accordance with the instructions in one of said coexisting registrations, means rendering said plurality of part moving means responsive to said coexisting registrations to simultaneously and automatically move said parts in accordance with the coexisting registrations of said first group of instructions, position indicating means controlled in accordance with the movements of said parts, means controlled by said position indicating means for arresting movement of said parts when the movements thereof equal the movements directed by the instructions in said coexisting registrations, and means for periodically operating said record feeding means to feed said record means relative to said sensing means for presenting second and successive groups of instructions to said sensing means so that said parts are concurrently moved as directed by each of said second and successive groups of stored numerical instructions.

18. A control system for a machine tool having a workpiece positioning part concurrently adjustable along or about different axes, said system being adapted for use with record means having separate coordinate defining instructions thereon each directing movement of said part a predetermined distance along or about one of said different axis, comprising sensing means controlled by said record means to establish separate coexisting registrations of the coordinate defining instructions directing the distances that said part is to be moved along or about said different axes, means controlled by said sensing means for automatically and concurrently moving said part along or about all of said different axes as directed by said coexisting distance registrations, a plurality of position indicating means each continuously adjustable in accordance with the movement of said part along or about one of said axes to successive settings representing the distance moved along or about the related one of said different axes, comparing means for continuously comparing the successive settings established in each of said position indicating means with the related instruction registration established by said sensing means to determine when the distance of movement of the part along or about the related axis equals the distance of movement directed by the registered instruction, and means controlled by said comparing means for arresting movement of said part when the distances moved by said part along or about all of said axes equal the directed distances of movement directed by said registered instructions.

19. The control system set forth in claim 18 in which the machine tool includes a tool part and which includes means operated in response to the said arresting of movement of the workpiece positioning part for providing relative movement of said tool part and said workpiece positioning part to effect a predetermined operation on the workpiece by said tool part.

20. A control system for a machine tool having a plurality of parts independently movable relative to different axes, said system being adapted for use with record means having separate plural order numerical coordinate defining instructions thereon each directing movement of one of said parts a predetermined distance relative to one of said axes; comprising sensing means controlled by said record means for reproducing and storing all of said separate numerical coordinate defining instructions; a plurality of separate drive means each controlled by one of said stored coordinate defining instructions for automatically and concurrently moving said plurality of parts relative to said different axes in accordance with the instructions; a plurality of part position indicating means each individual to one of said parts and each including a number of rotatable shafts related in number to the orders in the related coordinate defining instruction; a plurality of control means each controlled in accordance with the movement of one of said parts for adjusting the shafts of the related position indicating means to positions corresponding to the movement of said one part relative to its axis, said plurality of control means operating concurrently to adjust said shafts in said plurality of part position indicating means to positions representing the movements of said parts relative to said different axes; comparing means for continuously and concurrently comparing the positions of all of the part position indicating means with the related stored instructions; and means controlled by said comparing means for stopping movement of said parts when the distances actually moved by said parts relative to said axes equal the movements relative to said axes directed by the reproduced instructions.

21. A control system for a machine tool having a plurality of parts independently movable relative to different axes and adapted to use record means having stored thereon a plurality of separate numerical instructions directing movements of said parts relative to said axes, comprising sensing means controlled by said record means for establishing coexisting registrations of a group of said separate numerical instructions, a plurality of part moving means each controlled by one of said numerical instructions for moving one of said parts relative to its axis in accordance with the related one of the coexisting registrations, sequence means for sequentially rendering selected groups of one or more of said coexisting registrations effective in sequence to control the operation of the related part moving means, the rendering effective of two or more of said coexisting registrations causing simultaneous movements of two or more of said parts relative to their axes, comparing means for continuously comparing the movement of the parts with the movements directed by the related registered instructions to stop movement of the parts when the actual movements equal the directed movements, and means operative following the completion of all of the part movements directed by said coexisting registrations for operating said sensing means to establish coexisting registrations of another group of said separate instructions.

22. A control system for a machine tool having a movable part effective upon movement to vary the relative position of a workpiece and a cutting tool acting on the workpiece, said system being adapted to use a record on which the desired extent of movement of the part is stored, comprising means for sensing the record, part moving means controlled by said sensing means for moving said part in the direction to complete the stored extent of movement, means for continuously measuring the position of the part as it is moved and comparing it with said stored extent of movement, speed change means controlling said part moving means to first move said part at a first speed and operable in dependence on the measured position of the part when it is moved to a point a selected distance away from the completion of the stored extent of movement for controlling said part moving means to then move said part at a second speed lower than said first speed, and means for stopping the movement of the part when the measured extent of movement of the part compares equally with the stored extent of movement.

23. A control system for a machine tool having a work supporting member and a tool member and further including a main drive assembly for moving one of said members relative to the other, said system also being adapted for use with a record means bearing recorded instructions for directing movement of said one member, comprising sensing means controlled by said record means for reproducing said recorded instructions, means controlled by said reproduced instructions and including said main drive assembly for moving said one member, measuring means including means directly controlled in accordance with movement of said one member independent of said main drive assembly for measuring the movement of said one member, and means for stopping movement of said one member when the movement measured by said measuring means equals the movement directed by the reproduced instructions.

References Cited in the file of this patent

UNITED STATES PATENTS

| | | |
|---|---|---|
| 1,444,242 | Faust | Feb. 6, 1923 |
| 1,849,642 | Schenker | Mar. 15, 1932 |
| 2,484,968 | Sponaugle | Oct. 18, 1949 |
| 2,531,885 | Mills et al. | Nov. 28, 1950 |
| 2,594,358 | Shaw | Apr. 29, 1952 |
| 2,690,532 | Johnson | Sept. 28, 1954 |
| 2,710,934 | Senn | June 14, 1955 |

FOREIGN PATENTS

| | | |
|---|---|---|
| 111,789 | Australia | Nov. 7, 1940 |